Aug. 25, 1964 N. B. WALES, JR 3,145,822

TAPE ACTUATED MOVABLE MECHANICAL WRITING HEAD

Filed Oct. 24, 1960 3 Sheets-Sheet 1

INVENTOR.
NATHANIEL B. WALES. JR.

BY Chas. L. Johnson Jr.

ATTORNEY

TAPE ACTUATED MOVABLE MECHANICAL WRITING HEAD

Filed Oct. 24, 1960 3 Sheets-Sheet 2

INVENTOR.
NATHANIEL B. WALES. JR

BY Chas L Johnson Jr.

ATTORNEY

TAPE ACTUATED MOVABLE MECHANICAL WRITING HEAD

INVENTOR.
NATHANIEL B. WALES, JR.

BY Chas L. Johnson Jr.
ATTORNEY

United States Patent Office 3,145,822
Patented Aug. 25, 1964

3,145,822

TAPE ACTUATED MOVABLE MECHANICAL WRITING HEAD

Nathaniel B. Wales, Jr., Sharon, Conn., assignor to Monroe Calculating Machine Company, Orange, N.J., a corporation of Delaware Filed Oct. 24, 1960, Ser. No. 64,503
9 Claims. (Cl. 197—1)

This invention relates generally to information printing apparatus for association with data processing devices and more particularly to a tape actuated mechanical writing head.

In an important aspect this invention relates to machines for simply and rapidly establishing printed records in response to binary coded computer output signals.

Heretofore, a severe limitation has been imposed upon data processing apparatus. This limitation has resulted from the mechanical difficulties asosciated with transposing generated electrical information bearing signals into a permanent record for utilization of information stored thereon.

Information utilization often requires printing of that information on a record medium having two substantial dimensions, e.g., a sheet of paper, rather than on a simple linear tape. In such cases the substantial physical inertia of printing apparatus has limited character printing speed below the capabilities of the electrical signal generating circuits.

In the most well-known of printing machines, the typewriter, a large record supporting cylinder and carriage are transported longitudinally and the familiar alpha-numeric characters are imprinted on the paper by many selectively actuated keys. Such apparatus is quite capable of operating at extreme speeds of one character in each 100 milliseconds, i.e., 120 words per minute. Such a speed is totally inconsistent with the rapidity of modern data processing apparatus.

To avoid computer complexity, schemes have been devised whereby elementary space coded elements, for example, a 7 x 5 dot array, have been arranged to print distinctive representations of all needed alpha-numeric characters. Such expedients have eliminated the need for a complex computer.

These stratagems have, however, failed to eliminate the high inertia of relatively ponderous carriages and the complexities of mechanical linkages required for printing at two dimensionally selected positions on a record medium which is, by way of example, equivalent to a sheet of typewriter paper.

Typical arrangements have, for example, required rigid bars of substantial dimensions for positioning and actuating required printing members. Mechanisms of this sort accordingly become sluggish as increased speed of operation requires even greater increase in the acceleration of relatively ponderous members.

Thus, it is a principal object of the present invention to simplify character printing mechanisms.

It is a further object of the invention to reduce the inertia of character printing and positioning mechanisms and thus to increase printing speed substantially.

These objects and others are achieved, in accordance with the present invention, by providing arrangements in which a tensioned, light weight, flexible tape actuates an elemental printing mechanism variably positioned with respect to a record medium.

Thus, by way of illustration and for purposes of example, in one embodiment of the invention, a light weight printing carriage is mounted for transport longitudinally along a record supporting carriage member. Such a record supporting carriage member may be substantially equivalent to the cylinder of the well-known typewriter.

Pivotally mounted on this carriage are a plurality of simple arms each associated with a character element and all arranged for rotation about an axis transverse to the direction of longitudinal motion of the carriage member. Communicating with this carriage is a thin, flexible, but relatively nonextensible tape for each of the plural arms. Each tape passes in a loop about both of two respectively associated, low inertia, wheel or roller members. One roller member is fixedly mounted at one extreme record carriage position and the other is mounted at the other extreme record carriage position for signal-actuated, reciprocal motion in a direction substantially along the direction of longitudinal transport of the printing carriage.

The tape end portion associated with the fixed roller member is fixedly connected to the printing carriage. A tensioned spring member serves to connect the printing carriage to the opposite end portion of the tape, i.e., to the end portion associated with the signal controlled, movable roller member.

One of the pivotally mounted printing members is engaged with this opposite tape end portion in a relation to be actuated, as against the record medium, by longitudinal movements of the reciprocally moving roller member.

Thus, at least one of the plural arm members is actuated through tensioning of the low inertia flexible tape as appropriate urging signals are applied to the movable roller member. Upon relaxation of this signal, the aforementioned tensioned spring returns its associated arm member to a relaxed position.

In this illustrative embodiment of the invention all, save one, of the arm members of the aforementioned plurality comprise simple dot inscribing styli and are configured for cooperation with the record medium when appropriately actuated. Thus, the employment of plural such arms for printing elements of characters enables a substantial reduction in the inertia of the carriage and allows high acceleration transport of the carriage. The remaining one arm of this above mentioned plurality is a spacing arm for operation as discussed below.

Associated with the record medium supporting roller is a detent bar having uniformly spaced-apart stop portions. This bar is mounted substantially parallel to the direction of motion of the carriage.

Another flexible driving tape member is fixed at either end to the carriage and is circumferentially looped about two rollers. One of these last noted rollers is provided with a constant speed drive source, such as a motor. This source is brought into driving relation with the looped driving tape under signal actuation at an appropriate time as appears below.

Thus, illustratively, in one condition, an appropriate signal is employed to disengage the spacing arm from holding relation with the aforementioned detent member. This same signal engages the constant speed drive source with the looped driving tape. The drive tape and the low inertia carriage are thereby brought rapidly to a substantially constant speed in traverse across the record medium. Thus, the carriage traverses the record medium longitudinally, between detent bar stop portions, at a substantially constant speed with almost instantaneous start and stop. During this traverse actuating signals are applied, by appropriate means, selectively to actuate tape members individually associated with the plural record imprinting arms each of which includes a dot imprinting stylus.

This signal controlled actuation is accomplished by selectively urging the reciprocally movable roller members longitudinally to apply tension to the associated flexible tape. Hence, the respectively associated printing arms are urged selectively to print dots in uniformly spaced columns on the record medium. The uniform spacing of the dot columns follows immediately from the uniform traverse speed achieved by the low inertia carriage.

Thus, it is a feature of the invention that a flexible tape actuating member is disposed about the circumference of two longitudinally spaced-apart wheel or roller members.

It is a further feature of the invention that one of these roller members is fixedly mounted and that the second is mounted for reciprocal motion substantially along an axis corresponding to the longitudinal tape disposition.

It is a further feature of the present invention that one end portion of the tap actuating member is fixedly mounted in tensioned relation with a carriage member.

It is a further feature of the invention that the other tape end portion is connected to the carriage member through a tensioned spring member.

It is a further feature of the present invention that a printing arm is rotatably mounted in engaging relation with the reciprocally movable tape member for bidirectional actuation thereby.

As a still further feature of the invention, signal controlled actuating means are provided for urging the aforementioned second roller member reciprocally between extreme positions in response to information signals applied thereto.

Other objects, features and advantages of the invention will become more clear from a consideration of the following brief description of an illustrative embodiment thereof, the appended claims and the drawings which are hereby made a part of the specification and in which:

Figure 1:
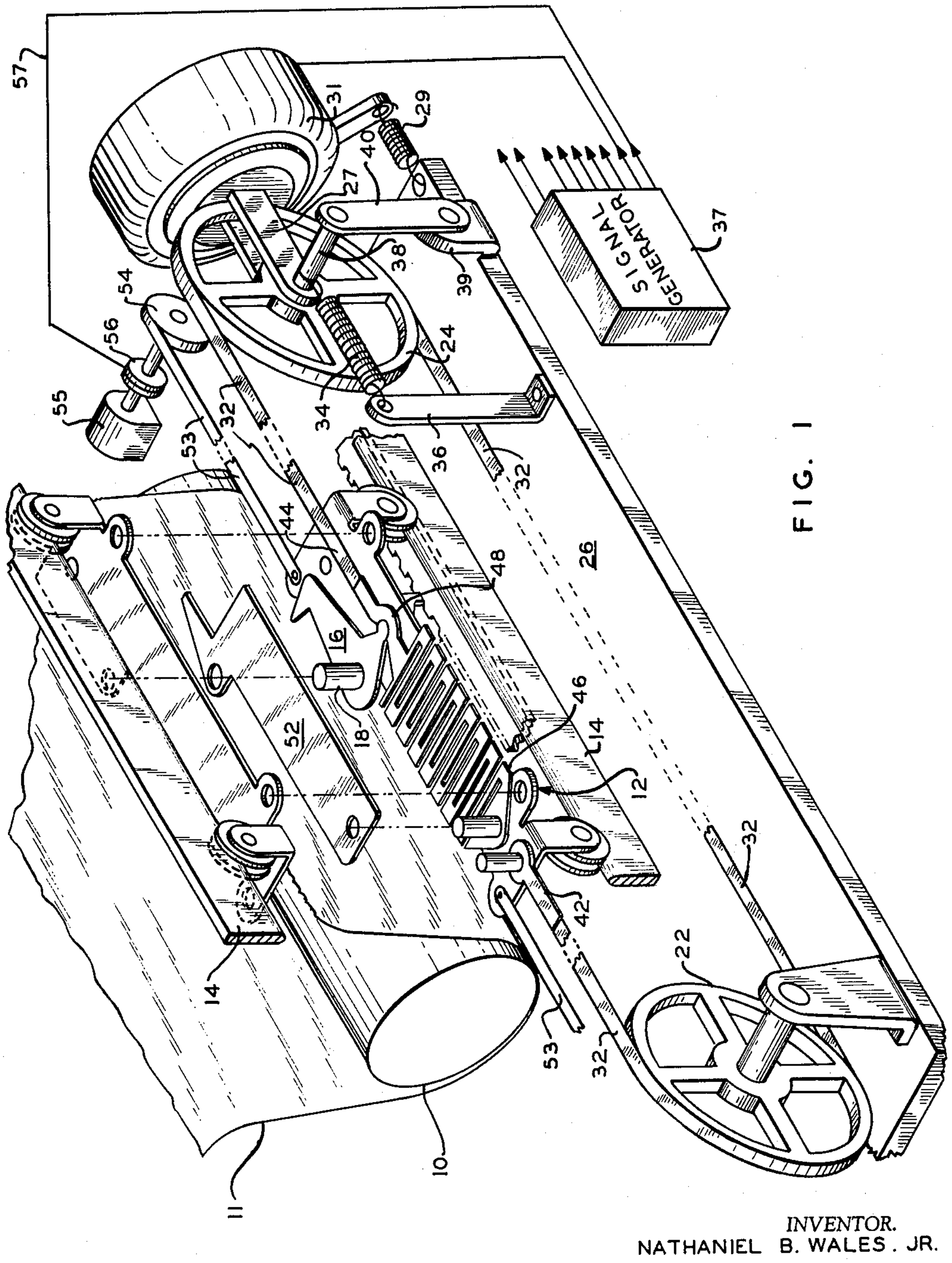
FIG. 1 is a partially exploded, partially sectioned, isometric view of a structure illustrating principal elements of a printing structure in accordance with the invention.

Referring now more particularly to the drawings, in FIG. 1 there may be seen a record supporting platen member shown as a roller or cylinder 10, about which is placed a record medium, such as the sheet of paper 11.

Associated with this cylinder 10 is a carriage 12 mounted for longitudinal motion with respect to the cylinder along tracks 14.

This carriage serves as a support member for a plurality of rotatable arms or printing styli 16, only one arm being shown for purposes of illustration. For this purpose, further discussion of the structure shown in FIG. 1 will be limited to a consideration of the single arm 16. As later appears in the discussion of FIGS. 2 and 3, however, it will be clear that this arm 16 is representative of a plurality of such arms, each of which is mounted for rotational motion about a common pivot member 18, associated with the carriage 12.

Associated with the arm 16 are first and second low inertia roller or wheel members 22 and 24, both of which are mounted on a frame member 26 of suitable configuration. The first wheel member 22 is journaled to the frame member for free rotation and the second member 24 is also journaled for rotation but in addition is mounted for reciprocal, translational motion in a direction along the axis of the cylinder 10, in other words from left to right as viewed in FIG. 1.

A magnetically responsive yoke 27 is fixed to the axis or hub 38 of the second wheel 24 for cooperation with a signal controlled electromagnet 31. A spring unit 29 secured between the electromagnet 31 and the frame 26 keeps tension on the tape 32 so as to prevent expansion or contraction of the tape from adversely affecting the operation of the writing head. A spring member 34 is similarly connected to the axis 38 of this roller member in tensioned relation with a mounting member 36 affixed to the frame member 26. A linkage member 40 is rigidly affixed to the axle 38 and is journaled to the lip 39 of frame 26.

Thus, the tensioned spring 34 holds the member 24 in one extreme position as shown. Upon energization of electromagnet 31 by a suitable signal, the magnetically responsive yoke 27 and wheel 24 are drawn to the right toward the electromagnet 31 against the tension of the spring 34, causing the link 40 to pivot clockwise. This signal is supplied from a signal generator 37 which conveniently may be one of many well-known computing devices from which signals may be selectively switched.

Wheel members 22 and 24 are appropriately constructed, as shown, to have low moments of inertia and a motion transmitting or flexible tape member 32 is passed about the two rollers. This member may conveniently take the form of tape or wire, steel or other material. If tape is used it should be relatively non-extensible and comprise two end portions 42 and 44. It is circumferentially disposed about the two roller members as shown. The one end portion 42 associated with the fixed member 22 is attached to the carriage 12. The other end portion 44, associated with the reciprocally movable member 24, is similarly fixed to the carriage as shown but through a resilient member such as a flat tensioned spring 46.

The end portion 44 is linked to spring member 46 by an arm engaging member 48. This arm engaging member is configured in association with the crank arranged arm for holding the arm away from contact with the record member 11 in a normal condition.

As a signal is applied to the electromagnet 31, however, the yoke 27 is drawn into contact with that electromagnet against the pressure of the tensioned spring 34. At the same time the tape end portion 44 acts to extend the spring 46; thus, to rotate the arm 16 about the pivot member 18, against the tensioned urging of the flat spring 46, to thereby cause the tip of arm 16 to strike the record medium 11.

Thereafter, upon relaxation of the electromagnet 31 the tensioned spring 34 acts to restore the wheel member 24 to an unactuated left-hand position and in conjunction with the flat spring 46 to withdraw the stylus arm 16 from contacting relation with record member 11.

Thereafter, by suitable means the carriage member 12 may be transported longitudinally along the tracks 14 for printing of yet another character.

Figure 2:
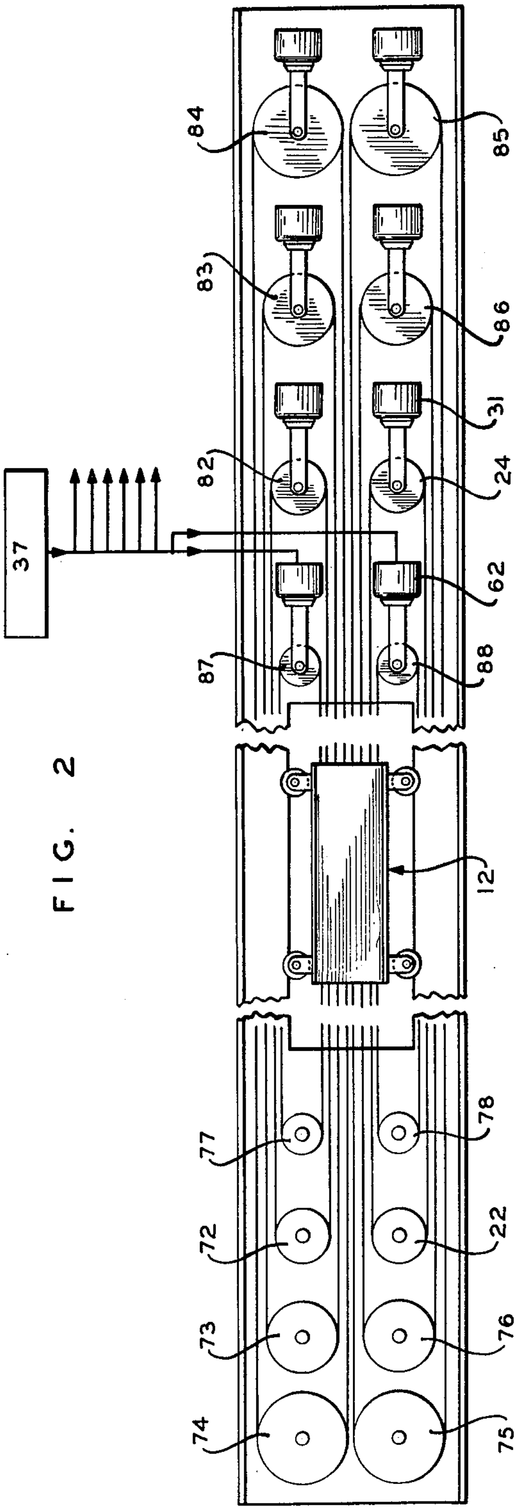
FIG. 2 is a partially sectioned, elevation view of plural tape driving mechanisms arranged in accordance with the invention for actuating a structure employing plural printing elements arranged in the relations outlined in FIG. 1.

In the simplified structure of FIG. 1, there has been shown in most elemental form the operation of a structure in accordance with the invention. Applying the structural elements shown in FIG. 2 in conjunction with the simplified structure of FIG. 1, the utility of structures in accordance with the invention becomes more clear. As was noted in connection with discussion of FIG. 1, the arm 16 is only representative of a plurality of such arm members all of which conveniently may be stacked on the pivot member 18 each being mutually separated by spacing members 52. Conveniently, these stylus members may be eight in number each for association with an electromagnet corresponding to electromagnet 31 and wheel members 22 and 24. Such an arrangement of wheel members with appropriate associated tape members is shown in FIG. 2 in conjunction with the carriage 12 with illustrative electromagnets 31 and 62. The signal generator 37 supplies appropriate energizing signals to electromagnets associated respectively with each of eight arms or styli.

Associated with each electromagnet are fixedly mounted wheel members 22, 72–78 and reciprocally movable wheel members 24, 82–88 respectively. As illustrated in FIG. 1, each pair of oppositely placed wheel members is connected to the carriage by a non-extensible flexible tape for actuating an arm member corresponding to the arm 16 discussed in connection with the structural details of FIG. 1.

Figures 3, 4:
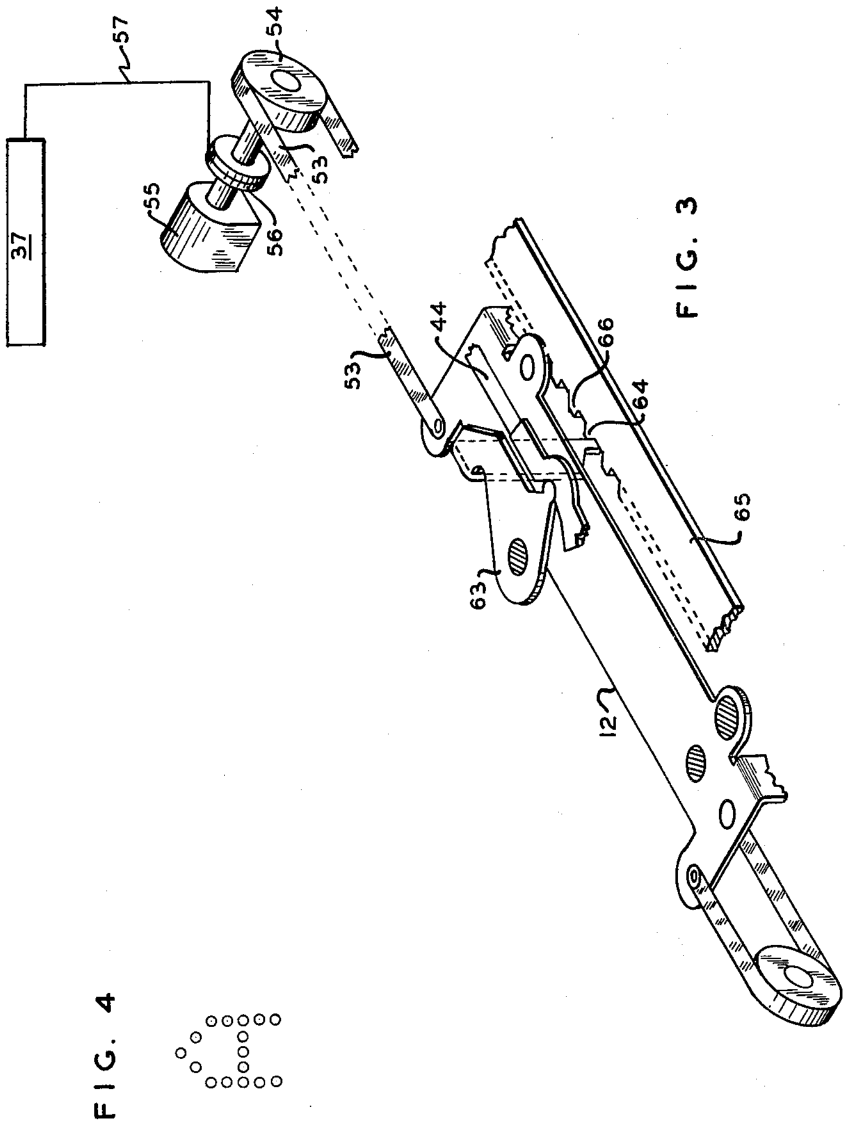
FIG. 3 is an isometric drawing of a spacing arm adapted for cooperation with a detent bar.
FIG. 4 illustrates an alphabetical character printed by a structure in accordance with the showings of FIGS. 1, 2, and 3.

The operation of this array of styli, in accordance with FIG. 1, as modified by FIG. 2 may be more clear with reference to the diagram of FIG. 4. Here is shown the character "A" printed in accordance with a well-known 7 x 5 dot matrix code. In an initial position designated 1 in FIG. 4, five electromagnets associated with roller members 24, 86, 85, 84, and 83, are actuated to print dots simultaneously in a vertical array of position 1. Thereafter, the carriage 12 is moved along the tracks 14 by suitable drive mechanism to position 2 where signals from the signal generator 37 energize wheel members 85 and 82 and so on until the letter "A" is completed by the selective printing of dots in five vertically arranged columns as shown.

As illustrated in FIG. 4, the illustrative character "A" comprises dots arranged in five vertical columns each having appropriate space allotted on the record medium for seven vertically spaced dots to appear. Thus, an array of seven printing arms as represented in FIG. 1 by printing arm 16 may accomplish the printing of a desired character upon selective actuation of the appropriate printing arms as the carriage 12 moves uniformly across the space allotted to a character on the record medium.

In the embodiment of the invention illustrated in FIG. 1, this motion of the carriage member is accomplished by a flexible driving tape 53 which is looped about suitable drive rollers. The drive roller 54 only is shown representatively. This drive roller is connected in driven relation with a continuously operating constant speed motor 55. This drive motor may be any of the many such well known in the art and is provided with a similarly well-known signal operated clutching mechanism such as magnetic clutch 56 which may be engaged by the application of a signal on conductor 57 from the signal generator 37.

The spacing arm array mentioned earlier is shown in FIGS. 2 and 3 and is operative by means of the carriage drive member 54 and is activated by electromagnet 62 and wheel 88, shown in FIG. 2. The array of FIG. 3 acts as a synchronizer or escapement which controls the actual stepping from one column to the next by actuation of electromagnet 62 without the corresponding actuation of any of the other seven electromagnets. By this means a space or blank column is provided.

With reference to FIGS. 1, 2, and 3 for structural detail, from an appropriate signal generator, such as 37, which may well be an appropriate electric computing apparatus as well known in the art, an appropriate signal is applied to engage clutch 56 with a drive motor 55 with the roller 54 through the lead 57. At the same time, a signal is applied to electromagnet 62 for disengaging arm 63 from a stop portion 64 of detent member 65. This occurs due to the tape 44 causing the arm 63 to pivot counterclockwise out of engagement with the stop portion 64.

Thereafter, roller 54 actuates tape member 53 to draw the arm supporting carriage from left to right as shown at a constant speed.

Owing to the light weight of the elemental character printing apparatus supported by the carriage 12, friction between the tape and the drive roller rapidly overcomes the inertia of the carriage and the actual printing mechanism is accelerated to its uniform traverse speed in an extremely short period of time. Thereafter, the carriage is moved at a uniform speed corresponding to the circumferential velocity of the wheel or roller 54. This uniform velocity of transport continues until such time as the carriage is brought to a halt as by impact upon the next stop portion 66 of the detent member 65.

During this interval of substantially uniform speed of traverse of the carriage between stop portions, signals from the generator 37 are applied to the magnets associated with rollers 24, 82, 83, 84, 85, 86, and 87 which are needed to print the next column of dots.

Figure 5:
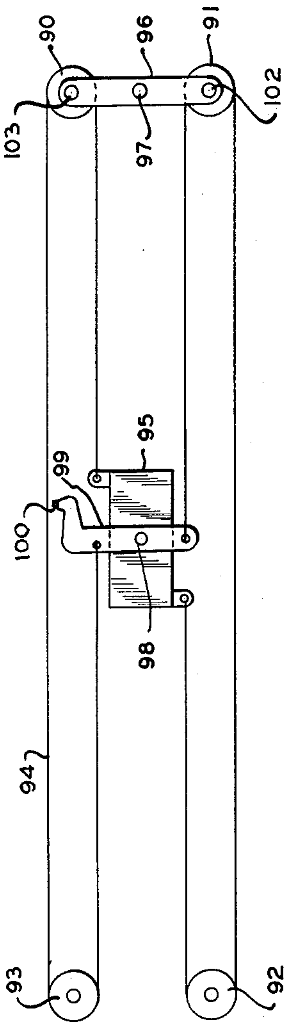
FIG. 5 illustrates another embodiment of the stylus operating apparatus.

Another tape arrangement is shown in FIG. 5 wherein a figure eight tape configuration is formed by encircling wheels 90, 91, 92, and 93 with the tape 94 and attaching the ends of the tape to the carriage 95 which has a central pivot 98. The link 96 is journaled to the axes 102 and 103 of wheels 91 and 90 and is in turn fixed to the axle 97 so that rotation of axle 97 causes rotation of link 96 and displacement of the wheel centers 102 and 103 with a resulting movement of the tape 94. This tape movement is directed against the stylus arm 99 causing pivoting thereof about its pivot 98 on the carriage 95 and movement of the stylus 100. Association of a stylus arm 99 and pivot 98, as in FIG. 1, with the carriage and tape of FIG. 5 will yield a high speed tape-actuated mechanical writing head which accomplishes the objects previously enumerated.

Thus, there has been described illustrative embodiments of the invention. It will be clear to those skilled in the art that many variants on the illustrative embodiments can be achieved without departing from the spirit and scope of the invention. Thus, by way of example, high acceleration and uniform high speed carriage transport can be imparted to the carriage by other varied mechanisms well known in the art without resort to the drive motor 55 and signal control switch 37 illustrated.

What is claimed is:

1. Printing apparatus comprising a first wheel journaled for rotation about a fixed axis, a second wheel journaled for rotation about a movable axis, a movable stylus, a motion transmitting member interconnecting the said first and second wheels and including a resilient portion having said stylus pivotally engaged therewith operative upon a tension change in the said resilient portion whereby diverging movement of said second wheel axis relative to the first wheel distorts the resilient portion of the motion transmitting member so as to move the stylus.

2. Apparatus according to claim 1 wherein the said motion transmitting member comprises a tape structure and the resilient portion includes a spring member.

3. Apparatus of the type disclosed comprising a frame, first and second rotative means mounted upon said frame and including rotative members, displacement means for displacing at least one of the rotative members' axis divergent from the other, recording means comprising a platen and motion transmitting means including a flexible tape interconnected with the rotative members and including a spring and a stylus interconnected so that displacement of a rotative member axis elongates the spring to impart movement of the stylus to abut the platen.

4. Apparatus according to claim 3 wherein the said motion transmitting means includes a spring member mounted between the said frame and a rotative member whereby constant tension is maintained upon the flexible tape to thereby compensate for any expansion or contraction of the tape which may occur.

5. Apparatus of the type described comprising a plurality of rotative members, a carriage member having a first pivot member mounted thereon, a stylus connected to the said first pivot member, tape means encircling at least a portion of each of the said rotative members and attached to the said carriage, and a second pivot member journaled to at least two of the said rotative members whereby pivoting of the said second pivot member displaces the two connected rotative members so as to displace the tape in a manner to cause the first pivot member to rotate to thereby activate the said stylus.

6. Information recording apparatus for establishing a character record on a longitudinally extending record medium which comprises a longitudinally extending record supporting member, a carriage member mounted for longitudinal motion with respect to said record supporting member, a first fixedly mounted roller member, a second roller member mounted for limited reciprocal motion in a direction corresponding to the longitudinal extent of said record supporting member, a substantially nonextensible tape member having a first end portion and a second end portion, said tape member being circumferentially disposed about both said roller members, said first end portion being fixed to said carriage member, spring means for connecting said second end portion to said carriage member, an information printing member rotatably mounted on said carriage member for making striking contact with said record supporting member, said printing member comprising means for engaging said second tape end portion, whereby said printing member is actuated toward and away from contact with said record supporting member upon longitudinal movement of said tape second end portion with respect to said carriage member, and signal controlled means for urging said second roller member for reciprocal, longitudinal motion with respect to said carriage member, whereby said printing member is urged toward and away from printing contact with said record supporting member.

7. Information recording apparatus for establishing a space coded character record on a longitudinally extending record medium which comprises a first plurality of character element printing members arranged in striking relation with said record medium, said members being mounted for rotation about an axis substantially transverse to the direction of longitudinal extent of said record medium, a carriage member for mounting said printing members, first and second roller members longitudinally spaced apart a distance in excess of the extent of said roller members, said first roller member being fixedly mounted with respect to said record medium and said second roller member being mounted for reciprocal, longitudinal motion with respect to said record medium, a flexible member mounted circumferentially about said roller members, said flexible member having a first end portion fixedly mounted to said carriage member and a second end portion, said second end portion comprising means for engaging a selected printing member of said plurality in actuating relation, spring means for connecting said second flexible member end portion with said carriage member and signal controlled means for actuating said second roller member longitudinally against the tension of said spring means, thereby to bring said selected printing member into contact with said record medium.

8. Information recording apparatus for establishing a character record on a longitudinally extending record medium which comprises a carriage mounted for motion in a direction corresponding to the longitudinal extent of said record medium, a plurality of record character element printing means mounted on said carriage for rotation about an axis transverse to said direction of motion, first and second roller members mounted in axially spaced-apart relation corresponding substantially to the longitudinal extent of said record medium, said first roller member axially being fixedly mounted with respect to said medium and said second roller member axially being mounted for reciprocal longitudinal motion in a direction corresponding substantially to the direction of axial spacing of said roller members, a flexible actuating member mounted circumferentially about said roller members and comprising first and second end portions, said first end portion being fixedly connected to said carriage proximate said fixedly mounted roller member, said second end portion being connected in actuating relation with one character element printing means of said plurality, a tension spring member connecting said second end portion with said carriage, and signal controlled means for urging said second roller member against the tension of said spring member, thereby to bring said one printing means in contacting relation with said record medium.

9. Information indicating apparatus comprising a plurality of rotatable members, a carriage member having an indicia bearing stylus arm member adapted to pivot and mounted thereon, flexible means interconnecting the said rotatable and carriage members so as to alter the said carriage member position in accordance with the rotation of said rotatable members, and displacement means for displacing at least two of the said rotatable members so as to cause the said stylus arm member to pivot.

References Cited in the file of this patent

UNITED STATES PATENTS

| | | |
|---|---|---|
| 548,611 | Hulse | Oct. 22, 1895 |
| 2,727,944 | Howard | Dec. 20, 1955 |
| 2,745,532 | Crawford | May 15, 1956 |
| 2,757,775 | Hickerson | Aug. 7, 1956 |
| 2,937,736 | Kuntzel | May 24, 1960 |

FOREIGN PATENTS

| | | |
|---|---|---|
| 369,614 | France | Nov. 17, 1906 |